United States Patent
Strasser et al.

(10) Patent No.: US 7,408,639 B1
(45) Date of Patent: Aug. 5, 2008

(54) TUNABLE OPTICAL ROUTING SYSTEMS

(75) Inventors: Thomas Andrew Strasser, Warren, NJ (US); Jefferson L. Wagener, New Hope, PA (US); Christopher S. Koeppen, New Hope, PA (US)

(73) Assignee: Nistica, Inc., Allentown, PA (US)

( * ) Notice: Subject to any disclaimer, the term of this patent is extended or adjusted under 35 U.S.C. 154(b) by 371 days.

(21) Appl. No.: 11/113,957

(22) Filed: Apr. 25, 2005

Related U.S. Application Data

(60) Provisional application No. 60/564,904, filed on Apr. 23, 2004.

(51) Int. Cl.
*G01J 3/28* (2006.01)

(52) U.S. Cl. .................. 356/328; 356/339; 385/18; 385/17

(58) Field of Classification Search ............... 356/328, 356/330; 385/18, 17
See application file for complete search history.

(56) References Cited

U.S. PATENT DOCUMENTS

| | | | |
|---|---|---|---|
| 5,960,133 A | 9/1999 | Tomlinson | 385/18 |
| 6,097,859 A | 8/2000 | Solgaard et al. | 385/17 |
| 6,631,222 B1 | 10/2003 | Wagener et al. | 385/16 |
| 6,891,676 B2 | 5/2005 | Ford et al. | 359/572 |
| 2002/0064341 A1* | 5/2002 | Fauver et al. | 385/25 |
| 2002/0145782 A1 | 10/2002 | Strasser et al. | 359/127 |
| 2002/0164114 A1* | 11/2002 | Golub et al. | 385/18 |

OTHER PUBLICATIONS

Doerr, C.R. et al., "Eight-Wavelength Add-Drop Filter with True Reconfigurability," IEEE Photonics Technology Letters, vol. 15, No. 1, Jan. 2003, pp. 138-140.

* cited by examiner

*Primary Examiner*—F. L. Evans
*Assistant Examiner*—Abdullahi Nur
(74) *Attorney, Agent, or Firm*—Mayer & Williams, PC; Stuart H. Mayer, Esq.

(57) ABSTRACT

An optical spectral detection device utilizing free space optical beam propagation is provided. The device includes at least one optical fiber input, at least one opto-electronic detection device, an optical element having an actuator with at least one tilt axis, and a diffraction element having a surface thereon. The device also includes an optical beam transfer arrangement positioned between the optical element and the diffraction element such that tilt actuation of the optical element elicits a proportional change in an angle of incidence of the optical beam onto the diffraction element, wherein the center of rotation for the angular change is the surface of the diffraction element. The spectral properties of the optical beam that are detected are selected by selectively positioning the optical element about at least one of the tilt axes.

19 Claims, 14 Drawing Sheets

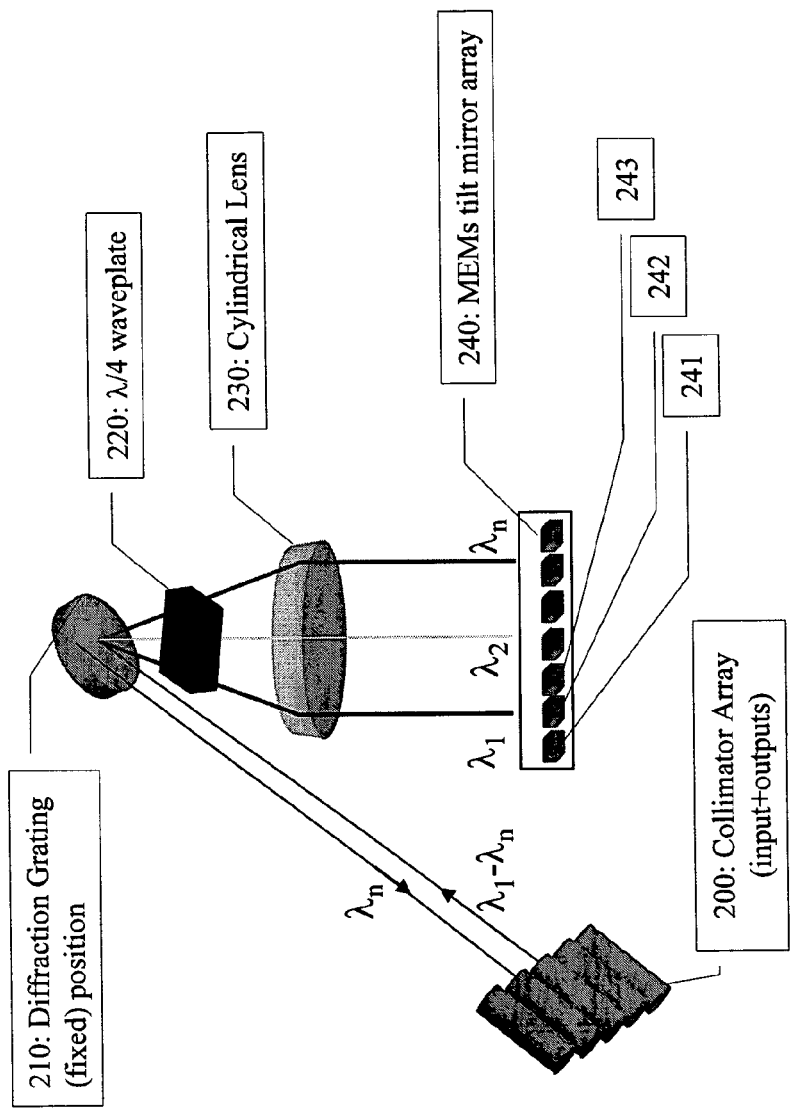
Fig. 2: (prior art) – Configuration of a Wavelength Selective Switch based on a free space diffraction grating

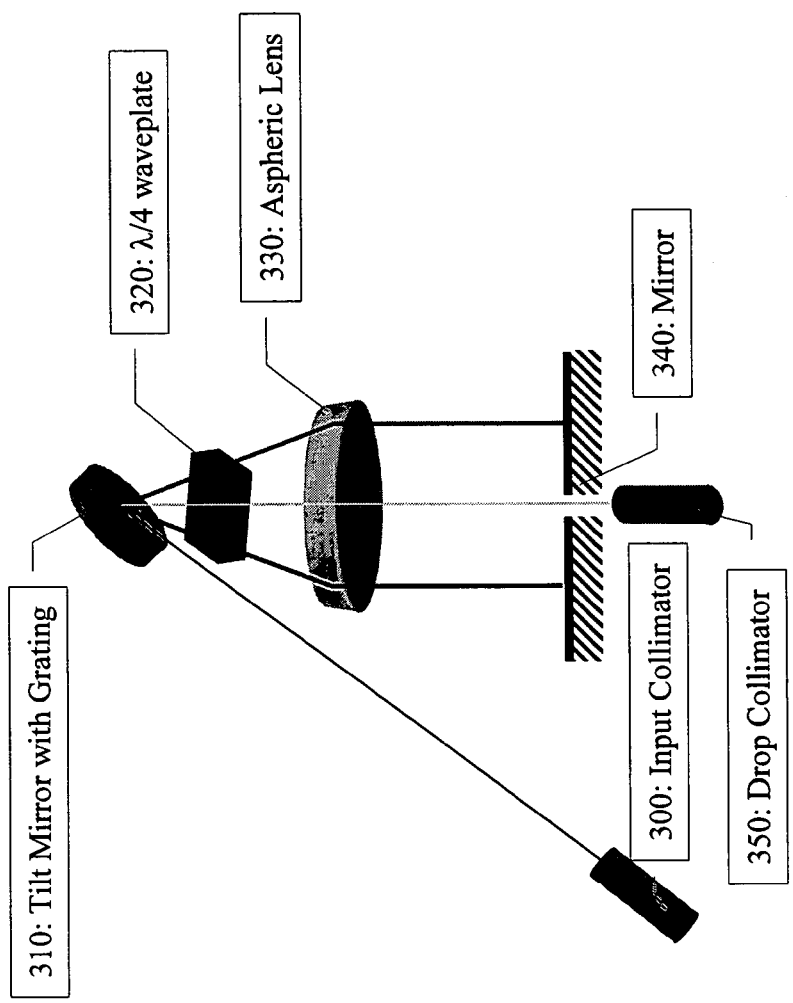
Fig. 3: Basic arraignment of Hitless Tunable Filter

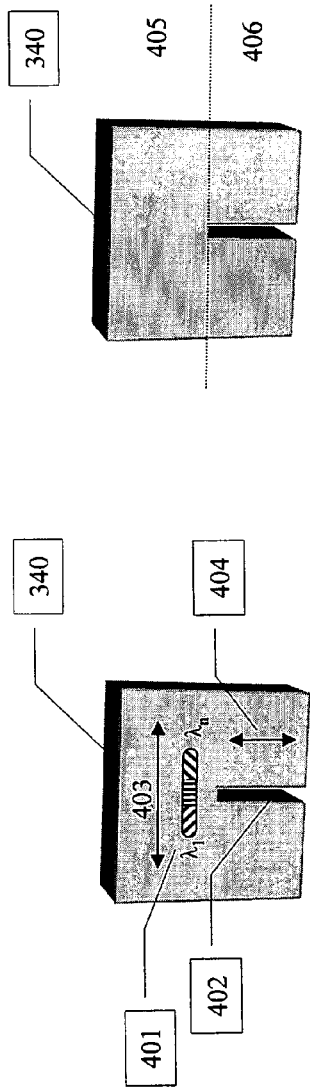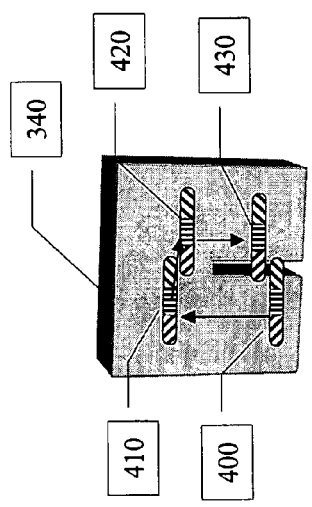
FIG. 4A
FIG. 4B
FIG. 4C
FIG. 4

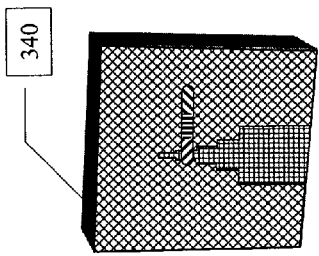
FIG. 5C
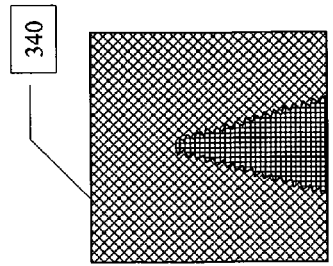
FIG. 5F
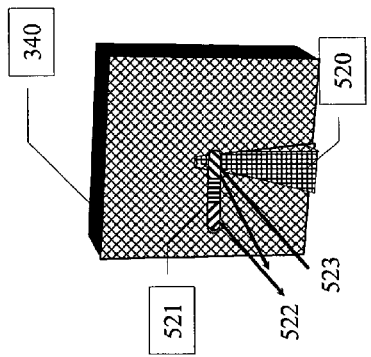
FIG. 5B
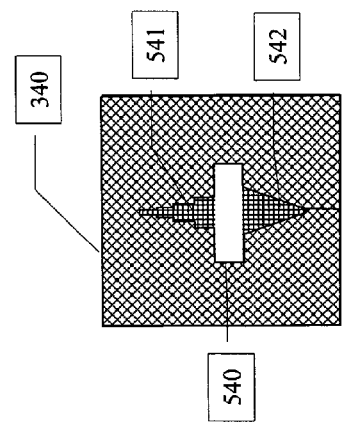
FIG. 5E
FIG. 5
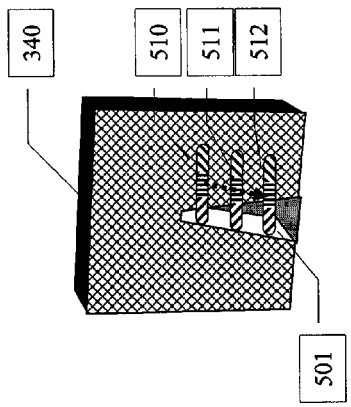
FIG. 5A
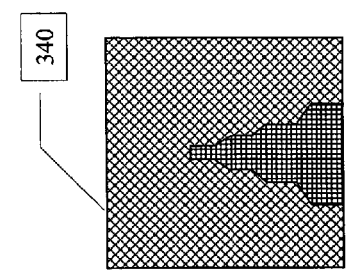
FIG. 5D

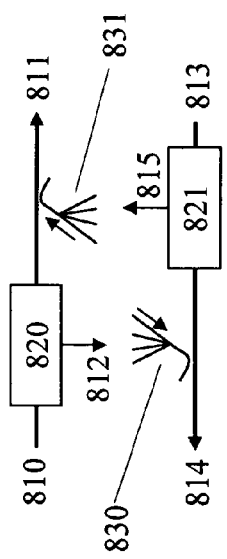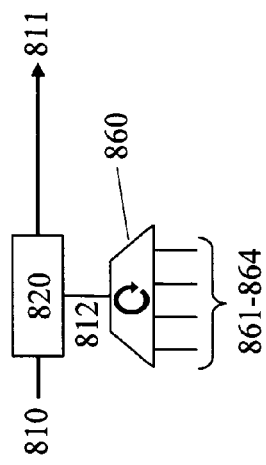
FIG. 8A
FIG. 8B
FIG. 8C
FIG. 8

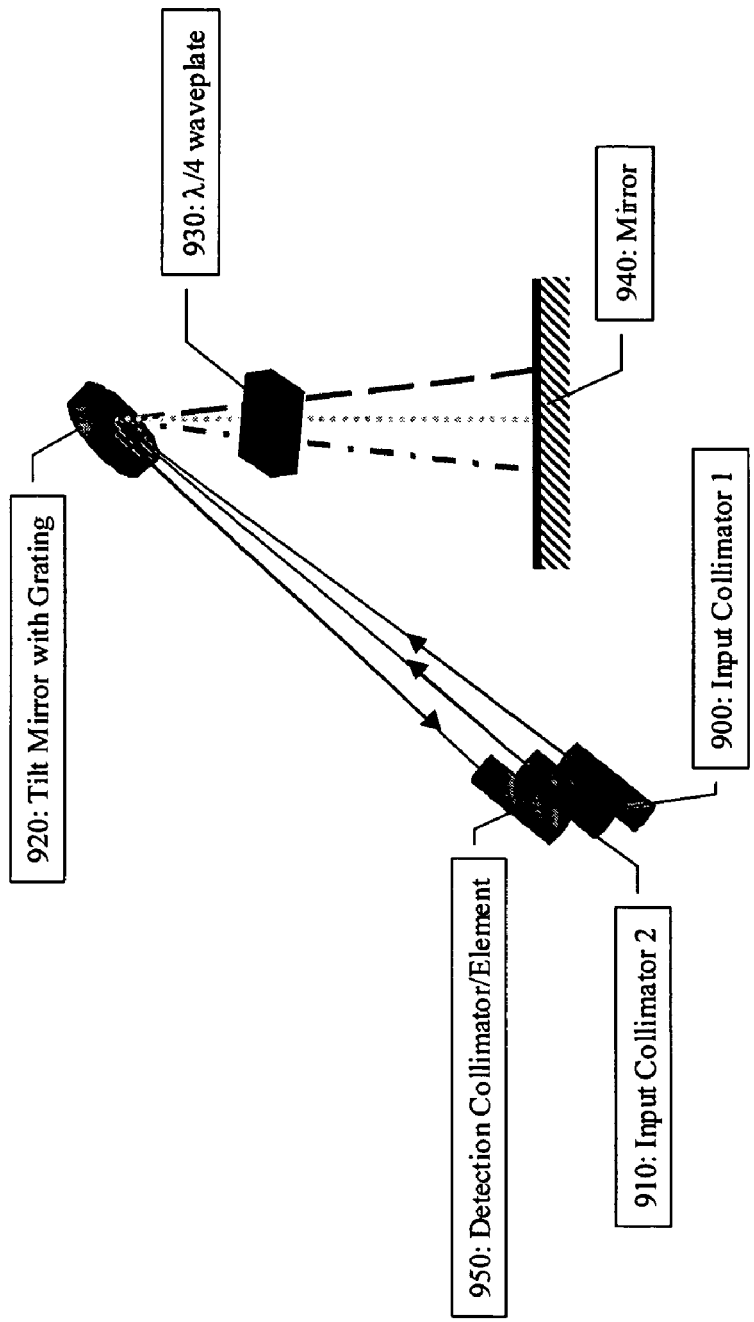
Fig. 9a: Basic arrangement of optical spectrum detection system

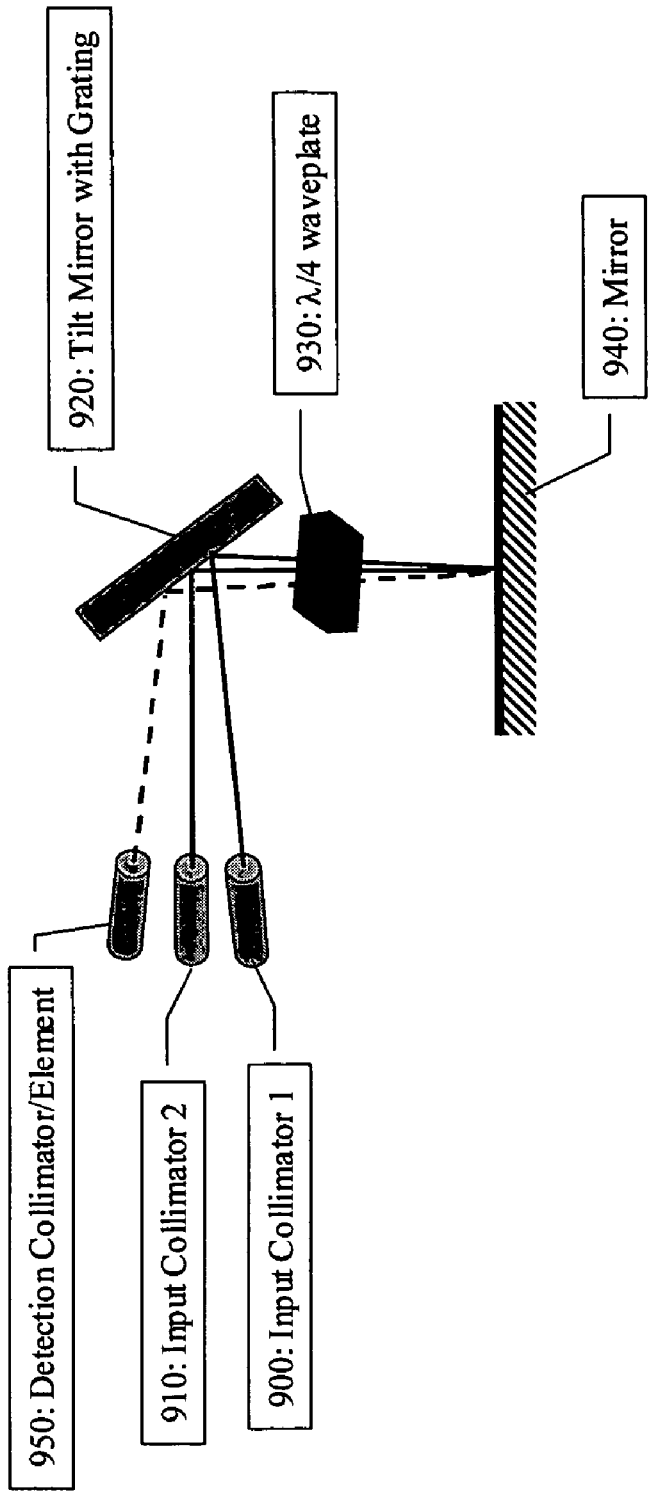
Fig. 9b: Beam propagation in axis perpendicular to the plane of dispersion.

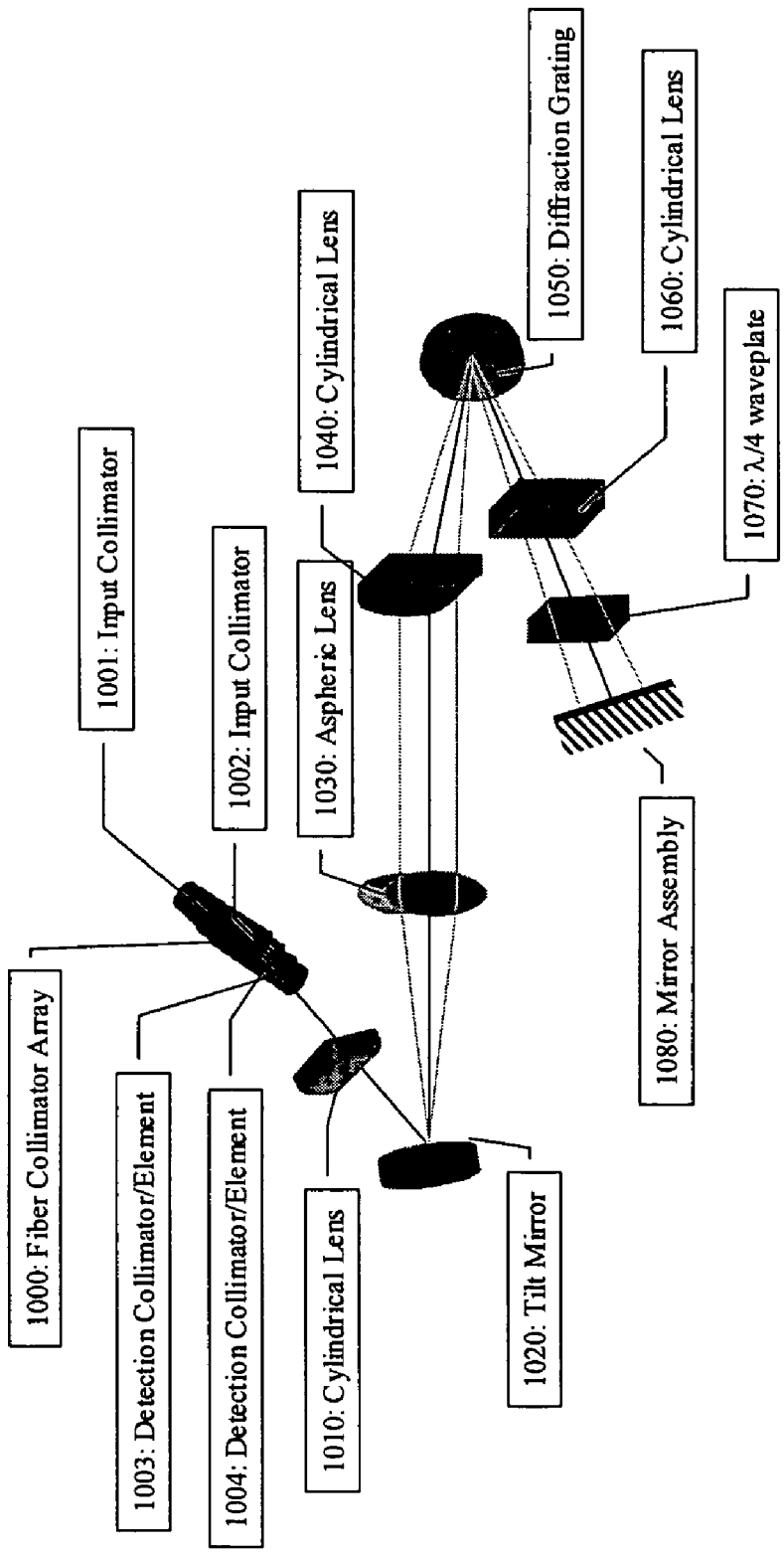
Fig. 10: Example configuration of optical spectrum detection system.

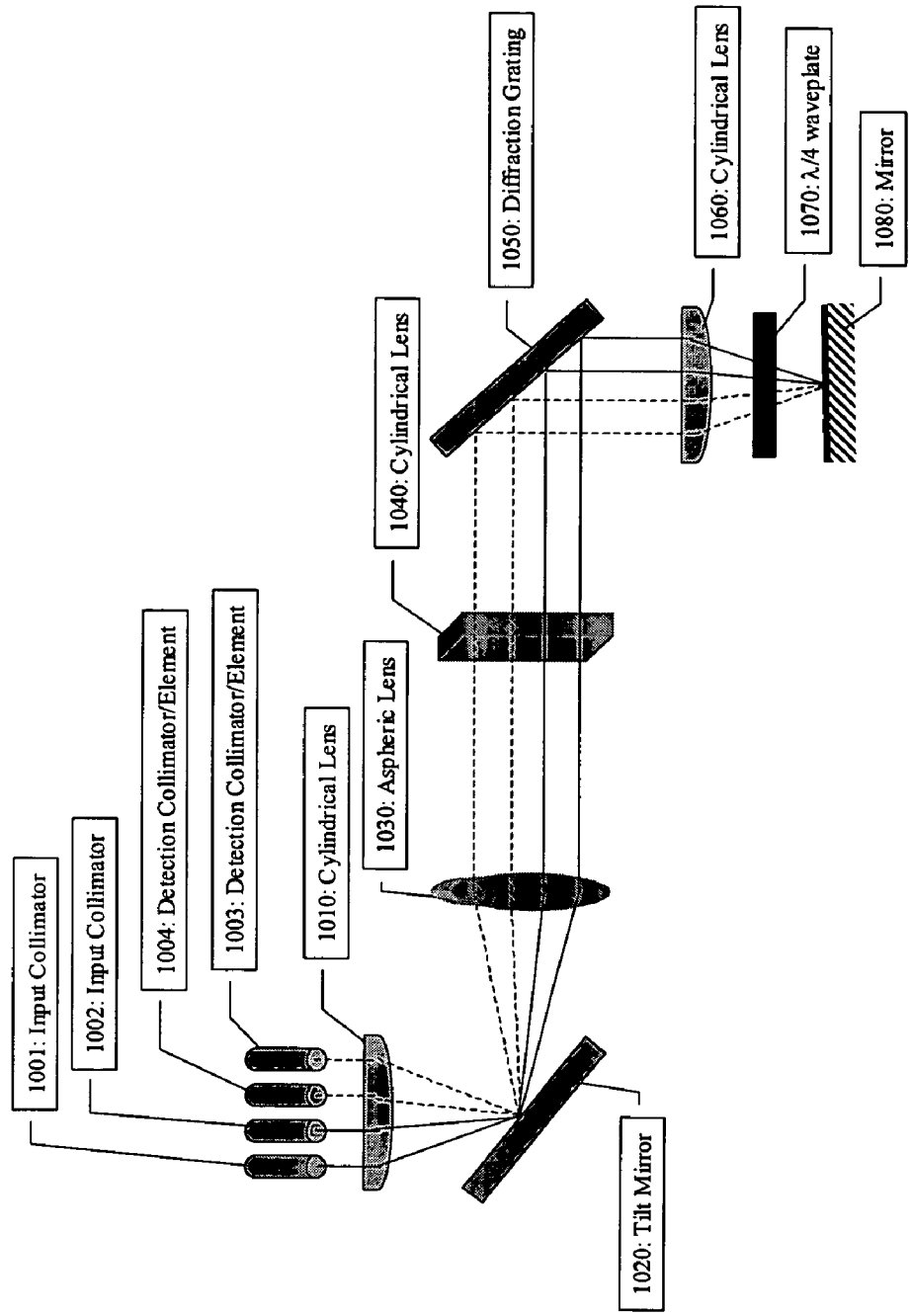
Fig. 10b: Beam propagation in axis perpendicular to the plane of dispersion.

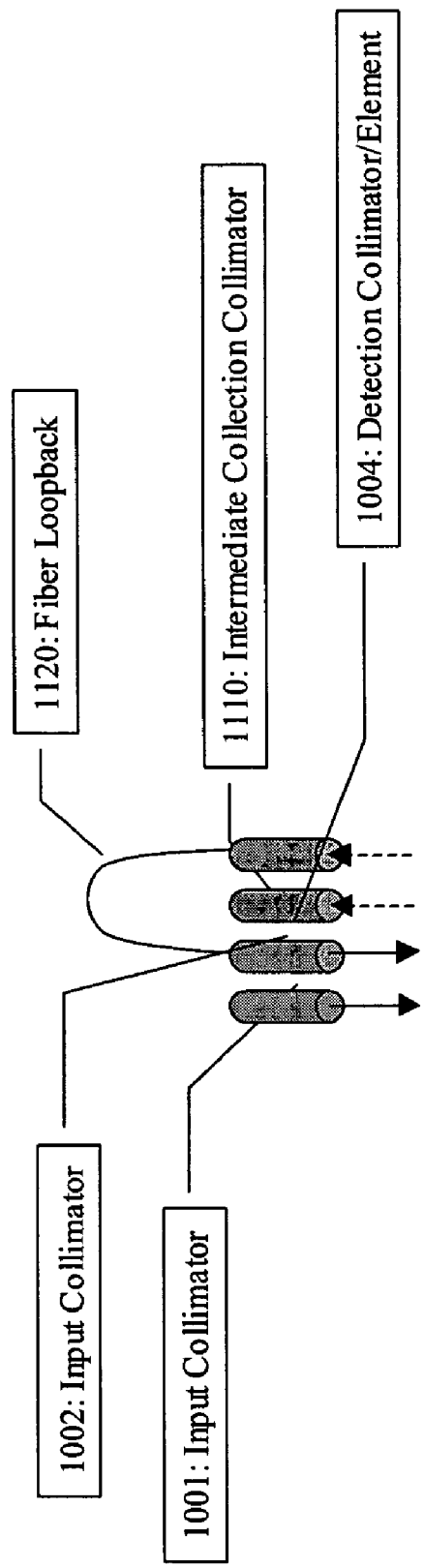
Fig. 11: Double pass configuration

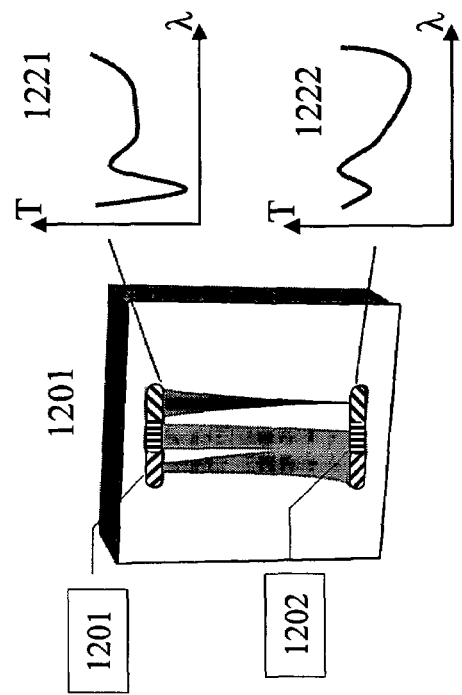
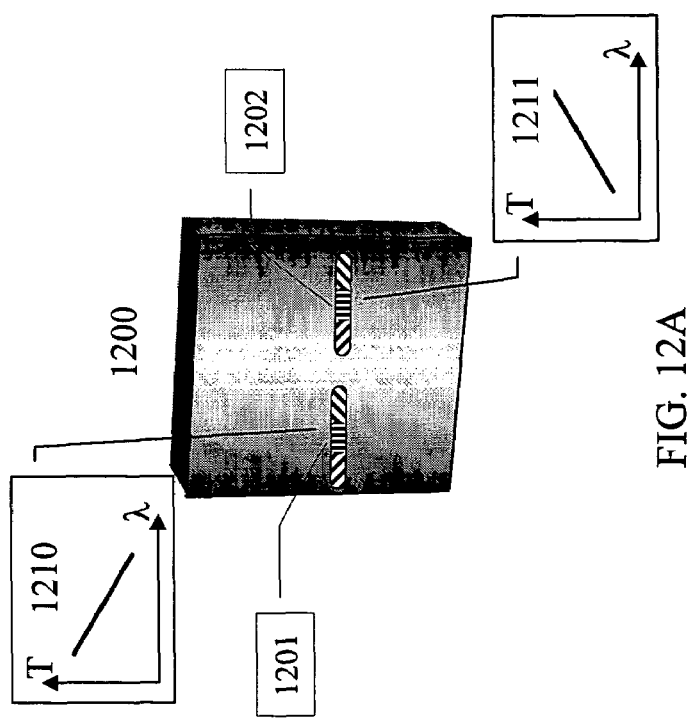
FIG. 12B
FIG. 12A
FIG. 12

TUNABLE OPTICAL ROUTING SYSTEMS

STATEMENT OF RELATED APPLICATION

This application claims the benefit of U.S. Provisional Application 60/564,904, filed Apr. 23, 2004, which is incorporated herein by reference in its entirety.

FIELD OF THE INVENTION

This invention generally pertains to wavelength division multiplexed optical communication systems, and more particularly to a means to direct light in a flexible manner, including the articles and means to construct such a system.

BACKGROUND OF THE INVENTION

There has been significant commercial interest in multiple wavelength WDM systems in recent years, hereafter referred to as Dense Wavelength Division Multiplexing (DWDM) systems. These systems leverage the capability of a single optical fiber to carry multiple wavelengths of light, a technique that effectively multiplies the bandwidth capacity of a given fiber by the number of wavelengths that can be transmitted. The demand for higher bandwidth communication systems has been driven by large increases in information flow driven by the Internet and other data traffic. In addition, the invention of Erbium Doped Fiber Amplifiers (EDFA) to amplify the power levels of many wavelengths in a single amplifier has further increased the application space of this technology because the amplification cost per wavelength for an EDFA is very low compared to the Optical-to-Electrical-to-Optical (OEO) regeneration that would otherwise be needed, hence it is much cheaper to send large numbers of wavelengths over large distances in a single fiber than it would be to send individual wavelengths over separate fibers. This economic justification has led to the transmission of large amounts of bandwidth in multiple wavelengths over a single fiber, and in turn has driven the need to flexibly route those wavelengths at the wavelength layer to avoid bandwidth scaling issues with electrical based switching (cost/size/heat dissipation/upgradability) as well as the expense of OEO regeneration that electrical switching requires. The availability of cost-effective signal amplification from the EDFA has in part supported increased functionality at the wavelength layer by providing a reasonable insertion loss budget for new subsystems to obtain this functionality.

The earliest wavelength routing devices preceded the EDFA, and generally leveraged wavelength dependent evanescent coupling between multiple waveguides, or the wavelength-dependent transmission of a dielectric Thin Film Filter (TFF) to passively route light along multiple paths in a wavelength-dependent manner. In general these devices have low cost and low insertion loss, however the wavelength-dependent routing configuration is static and the intrinsic device provides for no control or feedback of the optical signals that flow through it. These limitations have been overcome in modern communication systems by designing subsystems from these basic wavelength-dependent routing building blocks that integrate detectors for monitoring, Variable Optical Attenuators (VOAs) for power level control, and optical switches for changing the routing configuration. This integration can be in the form of discrete devices (or arrays of devices), integration on a Planar Lightwave Circuit (PLC), or a hybrid free-space Wavelength Selective Switch (WSS).

The WSS is the newest and perhaps the most scalable wavelength monitoring and signal control device because it operates on all wavelengths within a single free-space region, thus has a lower per wavelength cost for many wavelength devices. The functionality of the device is shown in 100 of FIG. 1, where any wavelength on input 101 of the device can be routed via switches 104 to any output port 110-117 at a preset attenuation (or power level) determined by the settings of VOA 103, where that routing is independent of the routing of the other wavelengths because the input demultiplexer 102 and output multiplexer array (105) create independent routing paths for each wavelength. This is essentially the most flexible wavelength routing device possible, and it is achieved with better performance (insertion loss, filtering characteristics) than available from discrete components or integrated PLCs. Although this WSS technology is not yet mature, it seems quite likely that the premium performance and price of this technology will enable it to dominate signal control and monitoring applications in devices where flexible routing of many wavelengths is required.

At the present time, the segments of the communication network with economic justification for flexible routing of many wavelengths are the long haul, regional and/or metro-core networks. In the metro edge and or access networks there are currently not many wavelengths at a given node, and the traffic pattern of the wavelengths present is almost exclusively hubbed, that is information collected from all the edge nodes on a ring are backhauled to a single common hub node. The most efficient optical layer protection for this well-defined traffic pattern is a simple dedicated (1+1) protection scheme and essentially one end of every service is a-priori known to be the hub node. For these reasons, the per-wavelength routing flexibility of a WSS is not nearly as valuable as in other parts of the network where mesh traffic patterns prevail. In addition, this edge portion of the network is shared by the fewest customers, and hence requires the lowest cost structure. Therefore it is likely that even though the WSS is more cost-effective than the other technology alternatives with equivalent functionality, it is likely too expensive to use at the edge of the network where the flexibility it provides may not add sufficient value.

While network edge components may not require the extraordinary flexibility of a WSS, it still can benefit from added flexibility. The edge of the current network is dominated by the Multi-Service Provisioning Platform (MSPP), which aggregate multiple clients through an electrical switch fabric, and transmit a single wavelength line signal to the hub node (typically along two diverse paths). However as the bandwidth for a single customer approaches the capacity of a single wavelength, the services provided would transition to "wavelength services", and numerous wavelength services might be required even within a single building that houses multiple businesses. Examples of these wavelength services are the full (non rate-limited) bandwidth services of Gigabit Ethernet (GbE) and 10 Gigabit Ethernet (10 GbE). This evolution of the network edge dilutes the value of MSPP electrical aggregation of many lower bandwidth signals into a single wavelength, while enhancing the value of DWDM networks that carry multiple wavelengths to a single access node. This type of network will typically be constructed from rings to provide signal protection through diverse path routing, and will have a hubbed traffic pattern such that traffic from all edge nodes is backhauled to the hub node. Today static TFF couplers largely service the DWDM Optical Add-Drop Multiplexing (OADM) at an edge node in this part of the network. These filters route (demultiplex) either a single wavelength or a band of wavelengths to a different output than the remaining DWDM wavelengths. Installation of new TFF filters breaks the optical path passing through a node, which is at the very least undesirable, and for many carriers unacceptable if signals from other nodes are interrupted. For this reason this part of the network frequently uses a TFF OADM that drop bands or groups of wavelengths from the express path. This approach has the benefit that only a single, relatively inexpensive and low loss TFF is needed at installation for the wavelengths passing through the node, thus adding additional drop wavelengths through that existing banded filter do not interrupt, or "hit" the existing services. Such a service addition does require installation of additional demultiplexing filters for each drop wavelength, however this installation is "hitless" because it does not impact the existing services.

There remains room for improvements of OADM flexibility in access applications even with the aforementioned benefits of TFF OADM. The need for improvement primarily stems from three limitations. The first is that for hitless upgrades of additional wavelengths the demands for each node need to be preplanned to correctly install the required TFF in the express path (through) at each node. This preplanning is not only time consuming, but also results in unused, stranded system capacity when capacity at that node does not materialize to meet the projected demand. The second limitation is the concatenation of multiple banded TFFs and individual demultiplexing drop filters is a time-consuming, manually intensive process that requires skilled craftsmen. The final limitation is this complex arrangement of filters can result in significant amounts of loss, including differential loss for different wavelengths. This loss variation results in a system reach that is wavelength-specific, implying wavelength-dependent engineering rules for the system that will be custom for every configuration. To mitigate this impact, systems typically install multiple individual attenuators on each transmitter to provide the required transmission performance for each channel. These latter two problems prevent the equivalent automation of signal routing in the optical layer as has always been provided in the electrical layer. This combination of non-automated, manual, and skill-intensive configuration procedures creates a barrier to fast deployment of DWDM at the edge of the network, and is in general an impediment to rapid deployment of cost-effective, high bandwidth services at the edge of the network.

Accordingly, it would be useful for a communication system to be cost optimized for the edge of the network while providing more automated line-side provisioning that does not require pre-planning while minimizing the probability that unused bandwidth will be stranded at the edge nodes. This application will describe such a system, including unique components and subsystems required for such a system.

SUMMARY OF THE INVENTION

In accordance with the present invention, an optical spectral detection device utilizing free space optical beam propagation is provided. The device includes at least one optical fiber input, at least one opto-electronic detection device, an optical element having an actuator with at least one tilt axis, and a diffraction element having a surface thereon. The device also includes an optical beam transfer arrangement positioned between the optical element and the diffraction element such that tilt actuation of the optical element elicits a proportional change in an angle of incidence of the optical beam onto the diffraction element, wherein the center of rotation for the angular change is the surface of the diffraction element. The spectral properties of the optical beam that are detected are selected by selectively positioning the optical element about at least one of the tilt axes.

In accordance with one aspect of the invention, the actuator has two tilt axes.

In accordance with one aspect of the invention, the two tilt axes enable substantially independent control of both a detected wavelength and optical power at such wavelength directed to the opto-electronic detection device.

In accordance with one aspect of the invention, the optical element is a MEMS tilt mirror.

In accordance with one aspect of the invention, the optical element is a resonant scanning mirror.

In accordance with one aspect of the invention, the diffraction element is a reflective diffraction grating or a transmissive diffraction grating.

In accordance with one aspect of the invention, the optical beam transfer arrangement is a lens-based telescope.

In accordance with one aspect of the invention, the optical beam transfer arrangement comprises a spherical lens and a cylindrical lens, whereby the optical beam transfer arrangement functions as a lens-based telescope along one optical axis and functions as a focusing/defocusing element in the orthogonal optical axis.

In accordance with one aspect of the invention, the optical fiber input comprises at least 2 optical fiber inputs.

In accordance with one aspect of the invention, the opto-electronic detection device comprises at least 2 opto-electronic detection devices.

In accordance with one aspect of the invention, at least 2 optical fiber inputs and at least 2 opto-electronic detection devices are provided In accordance with one aspect of the invention, the optical beam actuator has two tilt axes such that the two tilt axes enable substantially independent control of both the detected wavelength and the selection of input signal at such wavelength directed to the opto-electronic detection device.

In accordance with one aspect of the invention, the optical spectra of two optical beams received by the two fiber inputs are pair-wise directed to the two optical outputs such that identical spectral regions of the two optical beams are simultaneously sampled.

In accordance with one aspect of the invention, the optical spectral detection device further includes at least one fiber output and at least one fiber loopback. The fiber loopback is placed between the fiber input and fiber output such that a signal entering a different fiber input traverses at least two round trips through the diffraction region before being spectrally detected.

In accordance with one aspect of the invention, the optical element has two tilt axes such that the two tilt axes enable substantially independent control of both the detected wavelength and the optical beam coupling between the input signals and the fiber outputs or the opto-electronic detection devices so as to select a number of round trips of the input signals through the diffraction element before being spectrally detected to thereby select spectral resolution.

In accordance with one aspect of the invention, an optical spectral detection device utilizing free space optical beam propagation is provided. The device includes at least two optical fiber inputs, at least one opto-electronic detection device, an optical element having an actuator with at least one tilt axis, and a diffraction element. The spectral properties of the optical beam that are detected are selected by selectively positioning the optical element about the tilt axis.

In accordance with one aspect of the invention, an optical spectral detection method is provided for variably adjusting the spectrally detected wavelengths and variably selecting one or more input signals. The method begins by dispersing the spectra of one or more input signals laterally across an optical arrangement onto one or more opto-electronic detection devices. The position of one or more input signals is adjusted along a first axis to position a portion of the spectra directed to one or more opto-electronic detection devices. The position of one or more input signals is also adjusted along a second axis perpendicular to the first axis to select the input signal directed to one or more opto-electronic detection devices.

BRIEF DESCRIPTION OF THE DRAWINGS

FIG. 2 shows a configuration of a Wavelength Selective Switch based on a free space diffraction grating.

FIG. 3 shows one embodiment of a hitless tunable filter constructed in accordance with the present invention.

FIGS. 4A-4C show the positional dependence of the spectrally separated beam on the beamsplitter surface relative to the positioning of the tilt mirror depicted in FIG. 3.

FIGS. 5A-5F show various embodiments of the retro-reflecting mirror.

FIGS. 8A-8C show a three port hitless tunable filter used in various OADM configurations.

FIGS. 9A and 9B show different views of one embodiment of a multiple input optical channel monitor constructed in accordance with the present invention.

FIGS. 10A and 10B show alternative embodiments of the channel monitor depicted in FIGS. 9A and 9B, which employ separate grating and tilt mirror elements.

FIG. 11 the input collimators of FIG. 10 arranged in a double pass configuration.

FIGS. 12A and 12B show the wavelength dependent loss resulting from varying reflectivity over different mirror surfaces.

DETAILED DESCRIPTION

Figure 1:
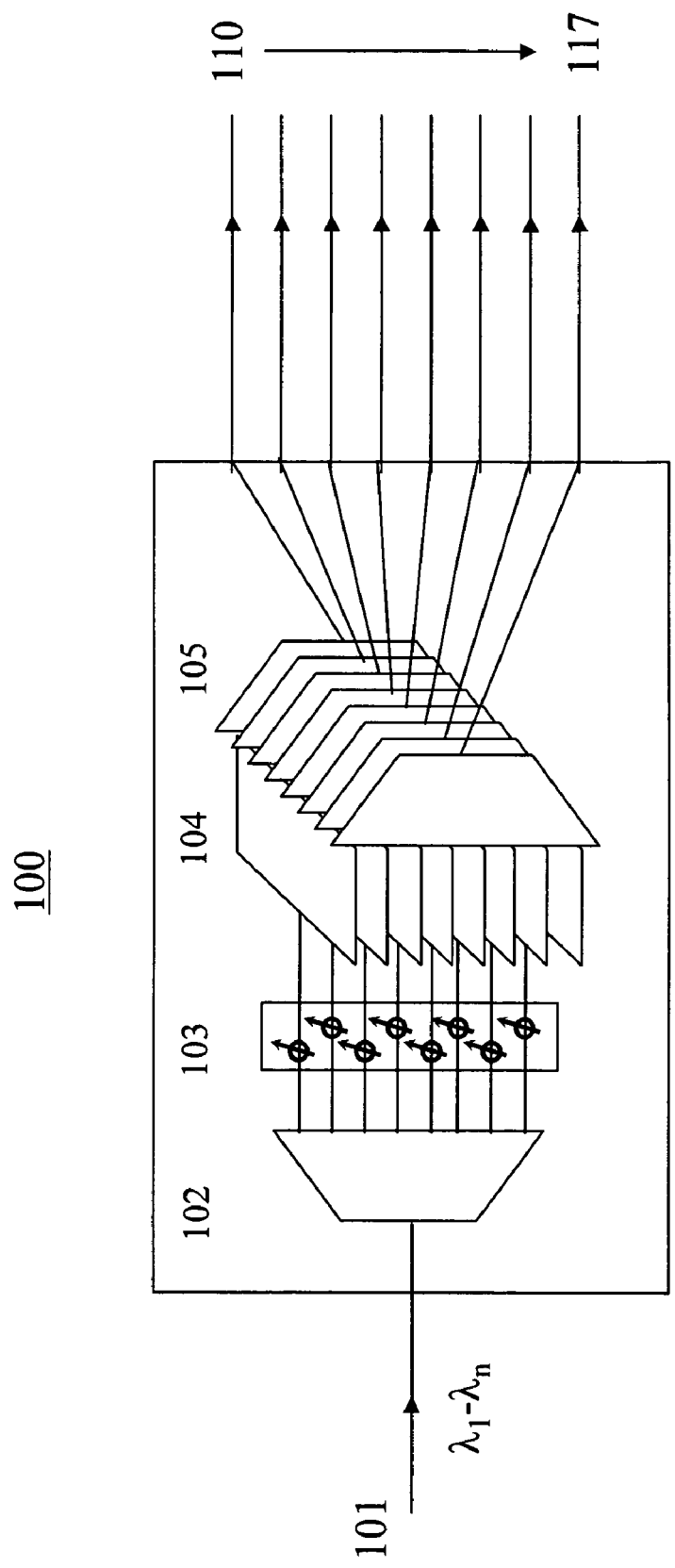
FIG. 1 shows a functional diagram of a Wavelength Selective Switch, which can be achieved with different technologies that do not necessarily employ the same discrete elements.

In accordance with the present invention, a Hitless Tunable Filter (HTF) technology is provided to flexibly route optical signals. It provides wavelength-selective routing functions in a much simpler and lower cost structure than currently available from existing WSS technology. Although this simplification somewhat reduces the functionality relative to a WSS, it retains a significant level of flexibility that would make it a superior choice for cost-sensitive network applications as it can be provided at a fraction of the cost, with a significantly reduced insertion loss, and with low polarization sensitivity as is required for virtually all communication system applications.

There are multiple technology platforms which have been used to demonstrate the functionality of a WSS, including free space optics with a diffraction grating (see U.S. Pat. Nos. 5,960,133, 6,097,859), free space optics with thin film filters (U.S. Pat. No. 6,631,222), and integrated photonic lightwave circuits (C. R. Doerr, et al., Eight-wavelength add-drop filter with true reconfigurability IEEE Phot. Tech. Lett. Vol. 15, Issue 1, 138-140 (2003)). FIG. 2 shows an exemplary prior art WSS arrangement of the diffraction grating approach. In this arrangement incoming light from one of the collimators in the input collimator array 200, and diffracts off a grating 210, which spectrally separates the input signal into different wavelength components, which are then focused with cylindrical lens 230 onto switch array 240. Switch array 240 has multiple tilting mirror elements, 241, 242, 243, etc., and typically contains at least one for each wavelength. The individual mirrors can preferably tilt in two axes to retroreflect the incident beam along a path that is offset from the input beam but parallel and in the opposite direction. The individual mirrors can be controlled such that these retroreflected beams can be coupled into other collimators in the collimator array that serve as output ports. Detuning the beam alignment relative to the optimum position can also control the power coupled into the output ports. This arrangement effectively yields a switch with the capability to route any wavelength from the input to the output at an adjustable power level, where the routing of each wavelength is independent of the others. This enables reconfiguration of any drop wavelength without effecting the power or crosstalk of any other thru or drop wavelengths. This is often referred to as "hitless" reconfiguration, where for true hitless configuration, the reconfiguration not only would avoid disrupting the transmission along the other paths of the device, but in addition no undesired crosstalk will arise from other wavelengths being coupled into any of the existing output ports during mirror repositioning.

A two port tunable filter that uses fewer elements than a WSS is disclosed in U.S. Patent Application 2004/0136074. This device discloses a number of arrangements using a tiltable diffraction grating to provide a tunable wavelength filtered output, however as disclosed this device has several limitations which make the device unsuitable for the majority of optical communication system applications today. Specifically, this reference does not disclose an implementation with low cost, low Polarization Dependent Loss (PDL), low Insertion Loss (IL) and high reliability required for communication system applications. The reasons these desirable properties cannot be achieved simultaneously by the filter shown in this reference is because of the following limitations described in the specification thereof:

(a) Need to double pass to allow a low insertion loss coupling of a multiple band wavelength spectrum to a single mode fiber output port as stated in the last sentence of paragraph 66

(b) when double passing need to have a 2 axis tilting mechanism and the diffraction grating co-located to maintain efficient optical coupling when tilting the grating (para 80)

(c) The only structures proposed that can simultaneously solve problems (a) and (b) with high reliability and low cost are the MEMs structures proposed in FIG. 17. However all commercially available high diffraction efficiency, low PDL gratings require highly specialized fabrication structures that are not compatible with MEMs fabrication processes and cannot be readily embossed or replicated as proposed. The MEMs gratings used in laser and spectroscopic applications have strong polarization dependence and a single axis tilt rather than 2 axes.

Additional problems with the device shown in the reference that are overcome by the present invention include:

No description is provided of how to scale from the two port filter to a conventional OADM device that provides 3 ports (input, express output, and filtered add/drop)

The concept and means to achieve hitless tunability is not described, and specifically how to reconfigure a conventional 3 port OADM to change drop capacity without disruption to any channels on the thru or drop paths.

The disclosed alignment of grating grooves relative to incidence angle preclude operation at the Littrow incidence condition required for commercially available high efficiency, low PDL gratings.

Does not provide a means for the output fiber to couple light from the different positions along the axis which has the spectral resolution (slit width) variation, thereby preventing the variable bandwidth feature of the optical transmissive filter discussed in connection with FIG. 9 of this application.

As will be seen below, the present invention overcomes these limitations of prior art by disclosing an optical telescopic arrangement that tilts a beam incident on a static grating about a "virtual pivot" point on the surface of the grating. This arrangement enables the virtual co-location of the 2 axis tilting mechanism and the diffraction grating while using off-the-shelf, 2 axis MEMs tilt mirrors as well as a high efficiency, low PDL grating that in its Littrow arrangement is also a standard part. When properly designed, this telescope can also provide beam expansion, which can be advantageous because the tilted beams can be small on the MEMs mirror to minimize mirror size, while the beams can be expanded on the diffraction grating where larger beams are desired to improve spectral resolution by illuminating more grating grooves. The present invention described below will leverage this concept to enable a low cost tunable filtering device with low IL, low PDL, multiple output ports and hitless reconfigurability in a compact, reliable device.

The arrangement of the present invention is shown in FIG. 3. In this invention, the input beam enters through an input collimator 300 and diffracts off a grating that is fabricated on a 2-axis analog tilt gimbal, 310. The diffraction off this grating is incident on aspheric lens 330, which is separated by its focal distance from the grating diffraction point. In this position, the lens will parallelize (collimate) the beams diffracted at different angles, which in the plane perpendicular to the grating lines corresponds to the wavelengths that are diffracted at different angles. The collimated beam with spatially separated wavelengths are then reflected off mirror 340, which reflects the beam, except for a small aperture in the center which allows a small wavelength range to be transmitted. The transmitted beam is then routed into drop collimator 350 for subsequent use in the system. The reflected beam passes back through the lens and grating, and is recollected at the input collimator. The input/output beams can be separated with a circulator, passive coupler, or by using a separate collimator (not shown). The output light can be coupled into a separate collimator located above the input collimator by tilting the surface normal of mirror 340 out of the page to reflect the output beam into the added output collimator. It should be noted that the polarization dependence of the grating diffraction efficiency is ideally very low to minimize the Polarization Dependent Loss (PDL) of the entire device. Gratings with low PDL are available commercially, however this PDL might be improved even further by adding a quarter waveplate 320 between the first and second pass of this device to cancel any remaining PDL. Low PDL could also be obtained with a high PDL grating via a polarization diversity approach where two orthogonal input polarizations are split, and one rotated to align with the other so they can pass through the device in the same polarization before rotation and recombination brings the two polarizations back together at the output.

FIG. 4 shows how the optical spectrum of the input beam moves along the surface of the mirror 340 as the spectrum changes with grating tilt. Tilt of the grating along the axis parallel to the grooves will change the diffraction angle of different wavelengths, which in turn changes the lateral position where different wavelengths reflect off the mirror as shown in 403 of FIG. 4A. Note when located over the aperture, tilt in this axis alters the wavelength passing through the aperture. For the purposes of clarity, this axis will be hereafter referred to as the Spectral Selection Axis (SSA). Tilting of the grating about the orthogonal axis moves the spectrum orthogonal to its SSA, as shown in 404 of FIG. 4A. If there is no spatial reflectivity variation over the mirror in this orthogonal axis, to first order there will be no impact on the coupling of reflected light into the output collimator. However if there is spatial variation on that axis such that no portion of the beam falls on aperture 402 in FIG. 4A it is possible to use the mirror to position the spectrum on or off this aperture along this axis which will hereafter be referred to as the Spatial Positioning Axis (SPA). From a device function perspective the mirror in FIG. 4A has two different operation regions as shown in FIG. 4B. In region 405 the mirror does not split the beam, and all wavelengths for the device design are transmitted from the input to the express output, independent of the positioning of the SSA (within limits of the device Numerical Aperture). In Region 406 the device acts as a tunable filter because the beamsplitter redirects one portion of the spectrum, and the wavelength that is dropped is tunable through control of the tilt of the SSA. If region 406 were used exclusively, there would be a change in transmission "hit" on intermediate channels as the SSA was changed to drop the correct wavelength. However, the existence of region 405 and the ability to translate through that region without impacting transmission of other channels enables the feature of "hitless" tuning. This operation constitutes a Hitless Tunable Filter (HTF), the operation of which is shown in FIG. 4C. In this FIG, the grating is originally tilted such that the input spectrum is located to drop $\lambda_1$ as shown by beam projection onto the mirror surface noted 400. Assuming a desire exists to tune the drop wavelength from $\lambda_1$ to $\lambda_n$, then the grating would first be tilted on the SPA to position 410, then tilted on the SSA to position 420, and finally tilted back on the SPA to enable drop of $\lambda_n$ when the beam is positioned at 430. The positioning of the SPA axis to operate the device in Region I during the tuning is the key to avoid interruption of the channel transmission of $\lambda_2$ through $\lambda_{n-1}$, thereby enabling the hitless operation. Note that the spectral properties of the beamsplitter 340 within region 406 are invariant with change in SPA along 404. One means to leverage that variation is to create a variation in the beamsplitter properties along the slit (e.g. reflection angle, reflectivity, or absorption) such that the output coupled from region 402 varies with SPA, thereby providing a VOA to tune this output relative to the output coupled from the rest of the mirror.

The aforementioned devices are also extensible to multichannel drop, including variable drop channel bandwidth. This is accomplished by having a beamsplitter for the drop bandwidth that varies spatially along the SPA axis. This could be continuously tunable if the beamsplitter width variation was continuous as shown in 501 of FIG. 5A, which would allow the drop bandwidth to be "tuned" by correctly positioning the tilt of the grating SPA axis to the position with the desired drop bandwidth. Tuning to wider filtering bandwidth is shown in the progression of the beam positioning from position 510 to 511 to 512. The drop signal collection arrangement as shown in FIG. 3 is deficient as the drop bandwidth grows to multiple channels, because at the location of the drop collimator the different wavelengths are distributed spatially. Because the drop collimator coupling efficiency drops as the incident beam is offset from the optimum coupling, this effectively means the coupling efficiency will vary as a function of wavelength, yielding less ideal spectral filtering properties. Because this path is a drop port that a signal will only transit once, this spectral shaping does not have to be an ideal flat top, however this effect will cause unacceptable insertion loss and/or a rounded transmission spectrum when coupling many channels. One method to avoid this trade off is to reflect the drop signal back through the lens and grating system with a small mirror, 520, that is tilted at a slight angle as shown in FIG. 5B, to enable the drop signal to couple into another collimator next to the input collimator. This approach spatially recombines the wavelength components reflected at an angle as shown in 523 into a single beam so they will couple to an output collimator with an insertion loss and spectral shape that is nominally independent of the bandwidth defined by the drop aperture. The independent, relative VOA capability described previously is one functionality necessarily lost when undertaking this double-pass approach because the beamsplitter variation along the SPA is used to change the bandwidth routed to a sperated output port, and therefore is not available to utilize as a VOA. Loss of this desirable feature may require that another degree of freedom be added to the drop device-coupling path such that optical power on that drop can be controlled. Possibilities include an independent degree of freedom to change the coupling of the drop collimator.

One potential drawback of the continuously variable beamsplitter geometry described above is that if the change in beamsplitter width is significant relative to the height of the beam on the mirror, this variation will degrade the filter function, changing the spectral transmission to make it less sharp than it would be with a constant width. Since tunable filter devices in general will require beams with cutting edge gratings, collimators and lenses to meet the stringent spectral filtering demands of DWDM applications, it is possible many applications will not be able to accept the filter degradation resulting from the continuous bandwidth tuning arrangement. However, an alternative approach could use step-wise beamsplitter transitions for the drop bandwidth as shown in 530 of FIG. 5C. Note that in FIGS. 5C-5F, the diagonal hatched mirror area is reflected in to the primary output port, and the square hatched area has a slight different reflection angle as shown in 5B to couple to a different output collimator. This approach will not sacrifice the spectral filtering, but still can yield a number of regions that have significantly different bandwidths. Similar to the continuously tuned device, the bandwidth will be decided by which segment the SPA grating tilt positions the grating on, while the absolute wavelength registration has analog adjustment with the grating SSA tilt. Because these are independent control parameters, when new bandwidth is desired from the filters, the mirror adjustments can independently control how much bandwidth is added (within the constraints of the beamsplitter variation), and whether that bandwidth is added to shorter or longer wavelengths than the existing drop bandwidth (depending on the SSA grating position). It should be noted that when shifting spectral bandwidths in the stepwise beamsplitter shown in FIG. 5C the sharp change in the beamsplitter may disrupt neighboring channels during reconfiguration because it is not impossible to seamlessly change to a new bandwidth filter while maintaining the spectral alignment of one edge of the filter. To minimize this problem it may be desirable to smooth the transition of the stepwise beamsplitter as shown in FIG. 5D. This enables the filter bandwidth to change more slowly such that the center wavelength can be adjusted in tandem to effectively maintain the wavelength of one edge of the filter while shifting the wavelength of the other wavelength edge.

Unique demands for OADM applications place additional requirements that can impact the ideal beamsplitter geometries. For example, due to optical protection requirements in systems it may be desirable in OADM applications to have the transmission on the thru (express) path that becomes opaque when power is lost. If the beam-tilting arrangement relaxes to the center position when this happens, it would be desirable to have a beamsplitter as shown in FIG. 5E, where the central region 540 is completely etched away to remove all reflection when the tilt actuator is not powered. This region could alternately be tilted or covered with absorbing material to avoid coupling of light in that position to the through port. Note the beamsplitter in FIG. 5E also has two independent beamsplitter geometries 541 and 542 above and below central region 540. This is useful because two independent modes of operation can exist for the same device. Thus the same device can have stepwise drop bandwidth of 541 if the mirror is tilted in one direction and continuously variable bandwidth of 542 if the device is tilted in the other direction. Both modes will have hitless capability if a beamsplitter-free mirror region exists to readjust the SSA as demonstrated in FIG. 4.

Low PDL when transmitting through a beamsplitter is one additional constraint. PDL can be a problem when low cost metal mirrors (e.g. gold) are used as reflectors adjacent to a narrow slit. This causes a PDL problem because the polarization of light defines the plane of electric field oscillation, and the light experiences different absorption depending on whether the electric field is oriented parallel to the slit edge where it can oscillate conductive electrons in the metal coat, where as the orthogonal polarization cannot conduct electrons due to the lack of continuity of the metal in that direction. For this reason, it may be advantageous to dither the edge of any transition at the edge of the beamsplitter to impart a uniform effect on both polarizations (see FIG. 5F).

The preceding arrangements are exemplary but not an exhaustive list of the functionalities that the present invention is capable of. For example it is foreseen that other mirror and beamsplitter arrangements can enable dropping bands of wavelengths in banded systems, and that the variable drop bandwidth slits in the SPA do not need to be contiguous bandwidth.

Figure 6:
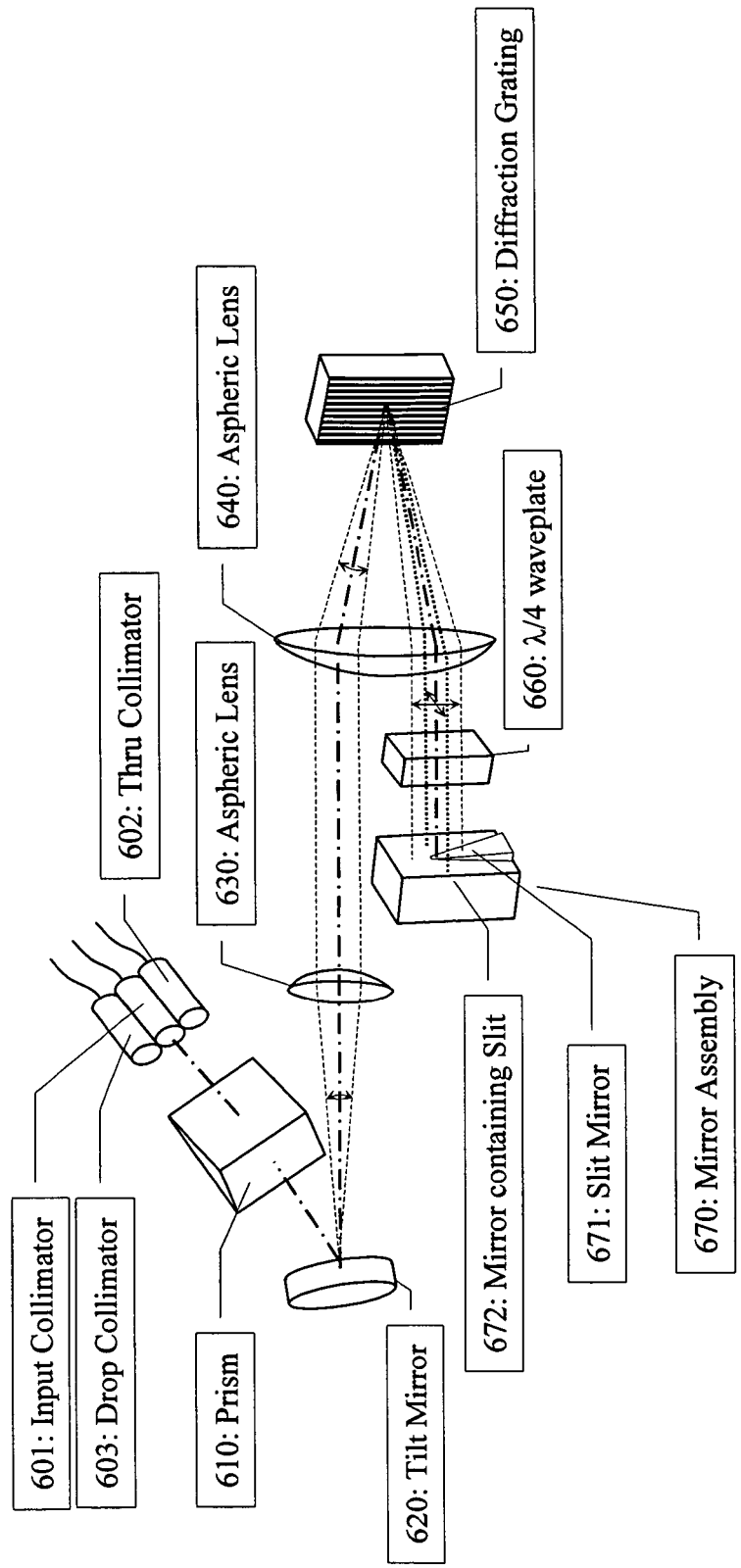
FIG. 6 shows an alternative embodiment of the hitless tunable filter constructed in accordance with the present invention.

The arrangement shown in FIG. 3 is viewed as the preferred embodiment from a cost perspective, however there are a few reasons why this may not be optimum for the foreseeable future. For example, the most reliable, low cost 2 axis tilt mirror available today is an optical MEMS made with silicon processing, which is not optimized to be integrated with low PDL diffraction grating profiles desirable in this application. For this reason it may be desirable to separate the grating and tilt mirrors into separate elements as shown in FIG. 6. This approach also requires more lenses and is necessarily less compact, however it can be readily fabricated with off the shelf components, and is likely cheaper and manufacturable in higher yields in the near term. The device operation is very similar to FIG. 3, with the exception that a two-lens telescope (630-640) is placed between the tilt mirror (620) and the diffraction grating (650). The optical path starts with a collimated beam following the center line exiting the input collimator 601 and traversing prism 610, which acts as an anamorphic beam expander to distort the circular beam that is output from the collimator into an elliptical beam that obtains higher resolution by illuminating more grating grooves. The beam then reflects off tilt mirror 620 into a telescope arrangement that effectively translates the tilt of the reflected beam off mirror to tilt of the incident beam onto the grating. When appropriately positioned with mirror 620 at the focus of mirror 630 and grating 650 at the focus of the lens 640, the tilting beam will remain stationary at the same point on the diffraction grating, and furthermore the focal lengths of the two lenses in the telescope can be adjusted to match the full tilt range of the mirror to the desired tilt range of the incident beam on the grating. This minimizes the stability requirements on the tilt mirror, and enables optimization for different operation bandwidths (diffraction angle ranges) without changing the two most complex optical elements (grating and mirror). When tilted along the SPA of mirror 620, the beam angle can be adjusted around the center line in the plane between the dashed lines. The diffraction grating is oriented with the grooves parallel to the plane of incidence from the telescope and would typically be positioned for nominal Littrow incidence angle. The diffracted beam is still collimated, but disperses laterally depending on wavelength (see dotted lines) before entering the lower portion of lens 640. Because the diffraction grating is at the focal length of lens 640 it transforms the angular dispersion of the spectrum into a collimated, elliptical beam along the spectral dispersing axis (into the page). In the plane of the page, however, the beam is collimated coming into lens 640 and is focused on the mirror assembly 670. All beam paths double pass the optional λ/4 waveplate whose axis is oriented to minimize polarision dependent loss of the device. Mirror assembly 620 acts as a beamsplitter for the incident elliptical beam, reflecting the beam reflected off surface 672 at the appropriate angle to coupling back through the device into thru collimator 602. The portion of the beam incident on slit mirror 671 is reflected back through the device at a different angle aligned such that the beam couples into drop collimator 603.

A further benefit of enabling the using the separate MEMs mirror enabled by the arrangement in FIG. 6 is that commercially available 2 axis tilt mirrors have embedded tilt position sensing mechanisms which can be readily used to accurately position the mirror for the correct wavelength and bandwidth drop in the absence of any input light. These sensors can also stabilize the mirror configuration to environmental changes and compensate for long term drift in the drive electronics.

OADM System Implementation

Figure 7:
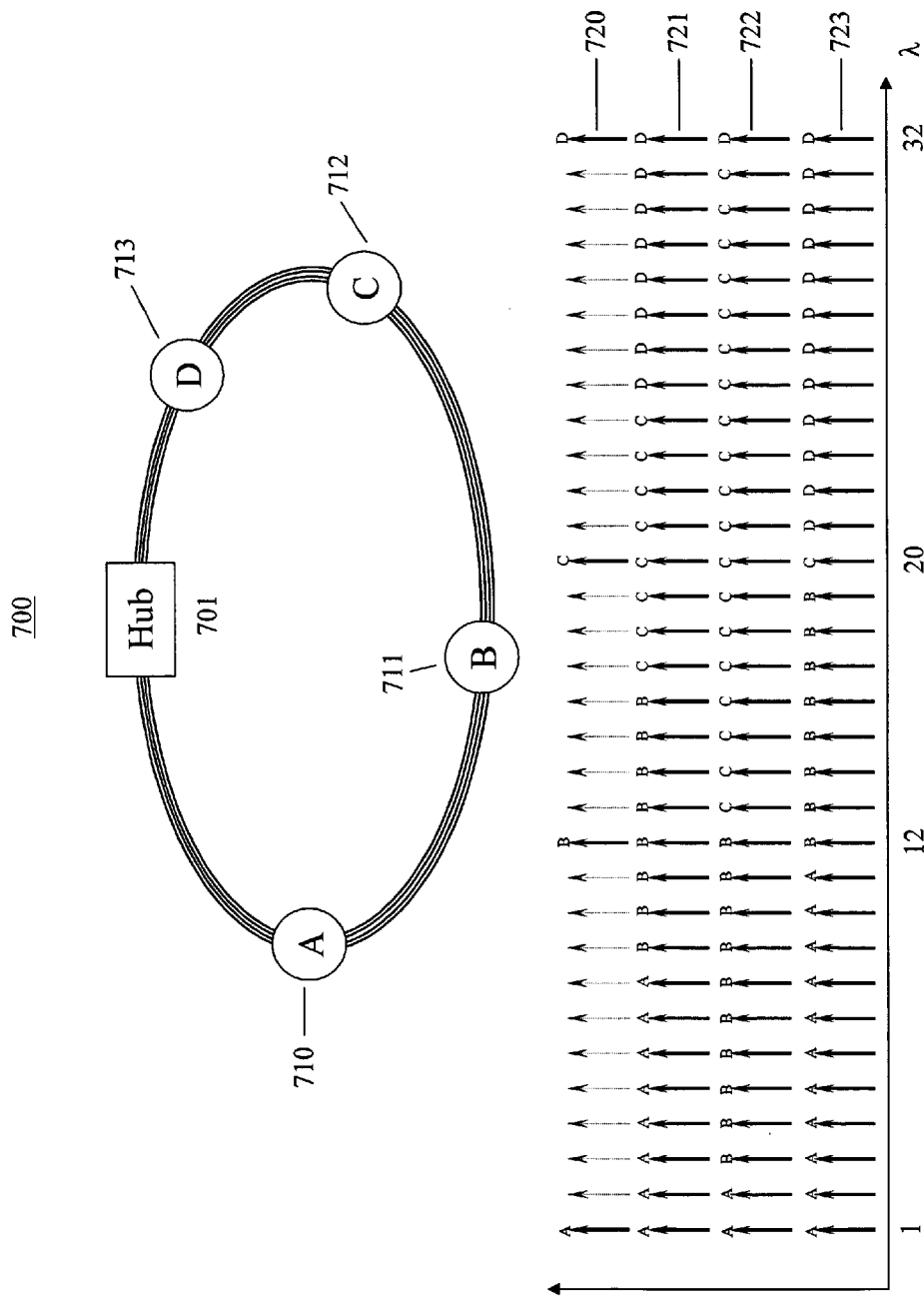
FIG. 7 shows a hubbed system architecture using a tunable hitless filter with dynamic drop bandwidth allocation.

A compelling system architecture leveraging the functionality demonstrated from this device is shown in system 700 in FIG. 7. This system uses the 3 port HTF 820, 821 described above in the OADM configuration shown in FIG. 8A. The 820 HTF has the variable drop bandwidth capabilities at each node to seamlessly grow optical drop bandwidth at each node to meet unpredicted bandwidth demand while minimizing stranding bandwidth. This is accomplished by starting each of the 4 feeder nodes in this ring with 1 wavelength as shown in 720, and appropriately spacing the initial wavelengths deplicted as solid, labeled lines among the dashed unused wavelength. As new wavelengths are needed, the HTF can add new drop channels on either the short or long wavelength side of its existing contiguous drop bandwidth. This decision can be made at provisioning time of the actual bandwidth demand as opposed to pre-planning. Because the decision regarding which wavelength to use is made later in time, the projection of where there will be spare capacity available should be more accurate. Furthermore, when deciding which new wavelength to provision—it is known the next contiguous short or long wavelength will be chosen, and it is known how many free wavelengths exist to share between the current node and the other node on the ring which shares that spare bandwidth. The wavelength on the side of the drop bandwidth with a higher ratio of supply (free wavelengths) to demand (any relative measure of the total demand at the two nodes for those wavelengths) should be used. Even when demands change with time, this approach tends to self-correct because if the supply/demand information is updated for each provisioning event, the wavelength allocation will shift to compensate for change in demand. The ability to incrementally add variable drop bandwidth is also amenable to adding channels with different data rates and different channel spacing to efficiently use the bandwidth for that data rate. While the wavelength selection procedure is described here as a manual process, it should be understood that this reasoning can be built into a wavelength assignment algorithm. Such algorithms are already used in modern WDM to optimize wavelength routing, and the procedure described above could be added to that algorithm to leverage readily available information to optimize the wavelength to use for a new demand. Note some of the relevant information to use in this algorithm are:
  1. how many nodes are in the network
  2. which nodes have similar contiguous bandwidth constraints
  3. how many free wavelengths are available on the low and high side of the currently dropped bandwidth
  4. how many wavelengths are already dropped at the node with the new wavelength request
  5. and how many wavelengths are dropped at the two nodes which are neighbors in wavelength space While this may seem to be an extensive list it is relatively straightforward to design such a simple algorithm that enables intelligent wavelength assignment, thereby minimizing wavelength stranding in the network.

It should be noted that this approach may not be 100% efficient and that some bandwidth can be stranded on the network. However, the ability to defer commitment regarding the wavelength allocation around a ring until provisioning time is very powerful to adjust to changing demands over time. This arrangement effectively enables the free channel bandwidth between any two nodes to be shared for upgrades rather than dedicated to a specific node. As shown in the exemplary wavelength assignments 721, 722 and 723 in FIG. 7, this enables bandwidth at a given node to be adjusted from a final drop bandwidth of 1 wavelength up to 19 wavelengths. This approach in general works better in rings with hub traffic and lower node counts, and it should be noted that if multiple wavelengths are dropped from the HTF those will need to be demultiplexed into individual wavelengths to route the signals to the appropriate transponder. Favorable OADM arrangements are shown in FIG. 8, where the HTF 820 is used to drop wavelengths onto output 812, while the express wavelengths which are not dropped continue to passive add coupling arrangement 831 before leaving the OADM on fiber 811. FIG. 8B shows the demultiplexing of multiwavelength drop 812 where passive splitter 812 is used as an inexpensive means to create multiple drop ports will all wavelengths. The multiwavelength output from a splitter port can then be made single wavelength by subsequently adding an appropriate fixed or tunable filter (850-853). An alternate demultiplexing arrangement is shown in FIG. 8C, where multiwavelength drop port 812 can be coupled into skip-0 cyclical demux 860. Cyclical demuxes are well known devices sold commercially as a colorless AWG by Neophotonics and ANDevices, or alternately sold as a PLC wavelength splitter by Hitachi Cable. An N port cyclical demux with the correct channel spacing is unique because a WDM input of any N contiguous wavelengths can always be demultiplexed into N individual output ports labeled 861-864 in FIG. 8C. This is significant in enabling a single code HTF based OADM that cost effectively demultiplexes a subset of the WDM channels. This works because the HTF in the present invention has a continuous drop bandwidth restriction, thus the cyclical demux is an elegant means to ensure single channel demultiplexing of any N channels in a single device.

It should also be understood that similar to the WSS, the HTF could be used as an adjustable transparent wavelength-dependent routing switch for WDM branching in mesh networks, and also for ring-interconnection or simple WDM cross connect applications. In all these applications the HTF does not bring the full flexibility of a WSS; however it will have a much lower cost which will potentially make it very valuable in applications where the more elegant WSS functionality does not add sufficient value to justify the cost.

The architecture leveraging the HTF as described in FIG. 7 is most advantageously deployed in networks with hub traffic patterns. This is because if one end of the service is always at the hub, that dramatically limits the number of different path combinations that must be supported by the optical layer. This architecture is most efficient when the total number of path combinations is limited such that the bandwidth shared between any two nodes represents a significant fraction of the total ring bandwidth. For mesh traffic patterns, there are significantly more possible path combinations that are needed, and the unpredictability of traffic demand becomes significantly more cumbersome. This is where the per-wavelength flexibility of the WSS enables the minimization of stranded bandwidth, thereby adding value to pay for the premium cost of the switch. However, even in mesh traffic rings, the HTF can bring a benefit for low traffic nodes. In this instance, the HTF would only drop 1 wavelength and would essentially function as an inexpensive WSS for that single drop. If the HTF costs $1/5^{th}$ of a WSS, then even if the devices are cascaded up to 3 or 4 drop ports the cost and insertion loss trade off would favor the HTF. This approach would require preplanning the number of HTF drops, however it will not require the additional drop path filtering necessary for the architecture in FIG. 7. In this configuration the HTF could be deployed at smaller demand nodes in the same ring with WSS nodes, with automatic provisioning and drop wavelength selectivity that could provision line side bandwidth as discussed in US Appl. 20020145782.

While the aforementioned systems and subsystem arrangements are described within the context of WDM communication system applications, it should be understood by those skilled in the art that the capabilities to filter can detect different spectral components of light are applicable to a broad range of non-telecommunication applications. It is also recognized that the combination of a polarization-independent grating integrated onto a 2 axis tilt gimbal is a platform that can yield multiple other interesting devices as described below.

Multiple lower functionality tunable filter devices are possible, including a 3 port tunable filter that is not hitless because the availability of the Region I bypass area on the mirror is lacking. Alternately this or the hitless version might be deployed as an add filter or a wavelength blocker rather than a drop filter, where passive splitting or other components are used to access the signal in a broadcast and select architecture. This same approach can also be used to fabricate a 2-port tunable bandwidth selection filter that isolates a subset of the DWDM input channels that can be flexibly determined depending on the beamsplitter pattern on the mirror. All of these applications use only a subset of that demonstrated for the HTF, however because the spectral performance of this arrangement is superior to many of the devices available, and the cost and insertion loss are comparably low, this higher functionality device will likely be competitive in these applications as well.

Another application space of potential interest with the concepts of this invention is that of an Optical Channel Monitor (OCM). In this arrangement, the output collimator can be directed to (or replaced by) a single photodetector that is monitored as the grating or mirror tilt is used to sweep wavelengths across the detector. Continuous sweeping and refresh of the channel spectrum are available with arbitrary tilt control, and as desired more detailed measurements can be made on a single channel for troubleshooting, OSNR measurement or faster sampling for spectral changes in the system. A couple of unique OMON functionalities of this arrangement are the tilt degrees of freedom can be used to selectively couple input signal from any of multiple input collimators to the photo detector. This combination effectively integrates a switch with an OCM, enabling the OCM function (and cost) to be shared over multiple measurement points. A second unique feature of the tilt control is that it can be dithered to impart a specific amplitude modulation that in turn can reduce detection noise through frequency lock-in detection techniques.

One embodiment of the multiple input optical channel monitor is shown in FIG. 9. FIG. 9a displays the beam paths and the angular dispersion of wavelengths as they diffract off of the diffraction grating. Light from a first source enters the device through input collimator 900. The input beam then diffracts off of a grating that is fabricated on a 2-axis analog tilt gimbal, 920. The diffraction off this grating passes through a quarter waveplate, 930, and is incident on a plane mirror, 940. The axes of the waveplate are oriented to minimize the polarization dependent loss observed throughout the system. The beams diffracted off the grating consist of wavelengths diffracted at different angles. The wavelength corresponding to the beam perpendicular to the reflecting mirror 940 in the plane of dispersion will be reflected back toward the diffraction grating, with one component of its direction parallel to its incident path. The orthogonal component of the reflected beam direction, that component perpendicular to the plane of dispersion, is determined by the tilt angle of the grating, 920, affecting that axis. The reflected beam makes a second pass through the quarter waveplate 930 and a second pass off the diffraction grating, which further disperses the light. The beam is then directed toward the detection collimator (element), 950, where it is collected and detected. By rotating the grating about the axis parallel to the grating lines directs different wavelengths into the detection collimator. Rotating the grating in this manner through the range of motion of the grating allows the detection of the corresponding wavelengths and determination of the optical spectrum. Further, by rotating the grating about the axis which lies in the plane of the grating surface and is perpendicular to the grating lines, the spectral beams can be directed away from the detection collimator, 950. This enables the configuration where no light enters the detection collimator. Such a state can be important for recalibration of dark current and other background drift with time and/or temperature. In this arrangement, there also exists a rotational position of the grating such that diffracted beams from a second source entering the device at the second input collimator, 910, are be directed into the detection collimator, 950. In a similar manner to that described above, the optical spectrum of the second source can be detected and determined. The beam propagation paths in the axis perpendicular to the plane of dispersion are shown in FIG. 9b. For optimal detection of the two input sources, the input and detection collimators should be aligned such their virtual beams (beams that would be present if light were directed through all the fiber collimators) substantially intersect at the mirror, 940. In this arrangement, there are two input ports and one detector port. It will be apparent to those skilled in the art that this invention is extensible to multiple input ports and multiple detectors elements.

As described previously, it may be desirable to separate the grating and tilt mirrors into separate elements. An embodiment of a multiple input port and multiple detector element optical spectral detection device employing separate grating and tilt mirror elements is shown in FIG. 10. In this arrangement, light from a first source enters the device through input collimator 1001 of the fiber collimator array, 1000. The fiber collimator array is constructed such that the virtual beams of each collimator in the array are substantially parallel. In this particular arrangement, the collimators are aligned in one dimension, though other arrangements could accommodate two dimensions. The axis along which the collimators are aligned, perpendicular to the beam propagation direction, will be call the port selection axis. The axis perpendicular to both the port selection axis and the beam propagation direction will be called the spectral selection axis. After the light enters the device through input collimator 1001, it impinges on a cylindrical lens 1010. As shown in FIG. 10b, the cylindrical lens focuses light only in the port selection axis. The beam then is reflected off the analog tilt mirror 1020, and directed to a lens system that comprises an aspherical lens 1030 followed by a cylindrical lens 1040, with the cylindrical lens focusing light only in the spectral selection axis. After passing through the lenses, the beam diffracts of the diffraction grating 1050, passes through a cylindrical lens 1060 and quarter waveplate 1070 before becoming incident onto mirro 1080. The cylindrical lens 1060 focuses light only in the port selection axis. As evidenced by the FIG. 10a and FIG. 10b, tilting the analog tilt mirror 1020 along one axis enables light from any input collimator to be directed to any detection collimator and tilting the analog tilt mirror along the orthogonal axis enables the spectral components of those input sources to be detected and determined.

It is evident from the arrangement of FIG. 10 that the multiple input and multiple output spectral detection device can be employed to enable simultaneous sampling of multiple input sources using multiple detection elements. By configuring the geometry of the collimators in the collimator array 1000 with the appropriate symmetry, multiple input to output detector connections are made simultaneously. Typical applications requiring simultaneous sampling of multiple sources are those measuring a sample under test relative to a reference sample.

A further application that leverages the arrangement of FIG. 10 is to enable a device with significant enhanced spectral resolution. A doubling of the resolution of the device can be achieved by looping back one of the collection collimators into a second input collimator as displayed in FIG. 11. In this configuration the input source will have diffracted off of the diffraction grating a total of 4 times. This can be extended further by adding additional collection ports, input ports and loopbacks.

For optical spectral detection applications, there may be advantages in some applications to employ a resonant scanning mirror rather than an analog tilt pointing mirror. The resonant scanning mirror is excited by an external driving force so as to oscillate the mirror continuously at its resonant frequency. There is a cost advantage of resonant scanning mirrors as they are used in high volume applications such as bar code scanners and laser printers. Additionally, such mirrors can have increased stability and immunity to mechanical disturbances because of their rotational inertia as they resonate.

More generally, the concepts of this invention are applicable to the field of optical spectroscopy. A typical optical spectroscopy application is to analyze the optical spectrum of an input signal over a targeted wavelength range. That is, the optical power as a function of wavelength is determined. The wavelengths ranges of interest can span the ultraviolet (UV), visible (VIS), near infrared (NIR), and infrared (IR) regions.

Yet another branch of extensions to this technology use a more complex 2 dimensional patterning of the entire reflection mirror in the HTF arrangement to obtain different functions. The first of these is an interleaver that alternately separates odd and even frequency channels from a common input. The mirror to achieve this would have a periodic beamsplitter pattern that alternately reflected a narrow range of wavelengths for each channel to what was described earlier as the output and drop ports (become even and odd ports in this application). Note that the active mirror is not necessarily required for this application if sufficient alignment accuracy and stability is possible. An advantage of this approach is that any pattern can be fabricated on that mirror, enabling an interleaver-like function, however with asymmetric odd/even channel spectra, aperiodic channel spacing, or any random arrangement of channels. Furthermore, if the mirror is present it could potentially be possible for hitless switching on the thru path between multiple of these possible functions. An example of this would be operating with a symmetric filter function until a high bandwidth channel is needed, at which point the device is tilted to a different tilt pattern that supports one or more higher bandwidth channels. A second pair of devices that utilizes a more complex spatially patterned mirror is a Dynamic Tilt Equalizer (DTE) or a Dynamic Gain Equalizer (DGE). This device is shown in FIG. 12, which shows a spatial mirror profile that is highly reflective in the center, with reduced reflectivity on either side. This spatial variation of a very complex pattern can be obtained by local variation of a dielectric reflector, or by spatially patterning a mirror with spots of a broadband metal reflection coating that vary average reflectivity by controlling the fractional area coverage (by density or spot size). As shown in FIG. 12A, tilting the grating along the SSA from 1201 to 1202 enables one side of the spectrum or the other to be selectively attenuated as shown in graphs 1210 and 1211. Thus the SSA tilt control becomes an adjustment for the spectrally dependent loss tilt, i.e. a DTE (SPA tilt could also be used with a more complex pattern). FIG. 12B shows how that concept can be extended to a more complex pattern that mimics the intrinsic gain shape change of an EDFA. In this configuration, the SPA tilt must be used for spectral adjustment because the spatial profile of the mirror is tied to specific wavelength features and SSA tilt would misalign that feature registration. It can be seen in this FIG. that moving the beam from 1201 to 1202 yields the desired wavelength-dependent loss spectrum to compensate an EDFA as shown in 1221 and 1222. Although the mirror fixes the profile of this DGE, this will likely not be a problem for modern EDFAs which maintain minimal lot to lot variation of gain shape during manufacturing.

3 Port Hitless Tunable Filter Example:

Orient an array of 3 fiber pigtailed collimators in a linear manner, with a beam center to center spacing of 1 mm each having a Gaussian beam diameter of 500 µm. The center collimator of the three is the input collimator (601), the upper one the thru collimator (602), and the lower one the drop collimator (603). The beams should point in substantially the same direction, specifically the angular deviation between the propagation direction between the input beam and either the thru beam or the drop beam should be less than 0.5 mrad.

In front of the collimator array is positioned a beam expansion prism (610). The prism is coated with an anti-reflective coating to minimize loss (including polarization dependent loss) at the angle of incidence of incoming and outgoing light. The prism forms an angle between the 2 optical faces of 40 degrees and an index of 1.45 at a wavelength of 1550 nm. The input beam enters the prism at an angle of 73 degrees. It then exits near normal incidence with a horizontal beam expansion factor of approximately 2.6. This then yields a beam with approximately 1.3 mm beam diameter in the horizontal dimension and a 0.5 mm beam diameter in the vertical direction.

Following the propagation direction of light exiting the prism from the input collimator, the beam impinges upon a 2 axis tilt mirror (620) in close proximity to the prism. This mirror has an optically flat surface and can be actuated via electromagnetic coils to tilt up to 5.5 degrees in any of the 4 directions left, right, up or down. The surface of the mirror where the center of the beams hit is then located 1 focal length from an aspheric lens (630) optimized for transmission in the 1530 to 1565 nm range with a focal length of 8.2 mm. The clear aperture of this lens exceeds 6.5 mm diameter.

After the input beam propagates thru the lens (630), the light propagates in the same direction independent of the particular tilt angle of the mirror. The beam focuses to a waist at another focal length (8.2 mm) from the lens. A second lens (640) is then inserted in the optical path, one focal length from this minimum waist position. Then focal length of the lens (640) is 37 mm, giving a separation between the two lenses of 45.2 mm. The clear aperture of this second lens exceeds 12 mm. Note that if light were launched from the drop or thru collimators, these beams would cross at the same special location as the minimum waist position.

The input beam, upon exiting the second lens (640) becomes collimated once again, and hits a diffraction grating (650) one focal length later. This collimated beam now has Gaussian waist dimension approximately 4.5 times that of the beam exiting the prism, specifically 2.25 mm in the vertical direction and 5.85 mm in the horizontal direction. The beam center to center spacing between each port started as 1 mm but is now approximately 4.5 mm. These beams are still parallel. The grating (650) has 1100 lines per mm a clear aperture of 15 mm by 15 mm, and has been optimized to have high diffraction efficiency and low PDL around 1550 nm at the Littrow angle of 58.5 degrees. The grating lines are oriented vertically, with the grating tilted 58.5 degrees from the lens optical axis in the horizontal direction (for Littrow incidence) and 3 degrees downward in the vertical axis. Light scattering off the grating comes back toward the lens (640) at approximately the same angle in the horizontal direction but with some spectral deviation. Specifically, 1530 nm light comes off the grating at 56.1 degrees while 1565 nm light reflects at 59.7 degrees, measured with respect to the grating plane.

When the collimated input beam passes back thru the long focal length lens (640), it gets focused in both directions onto a reflecting mirror (670) positioned one focal length away from the lens. Before hitting the mirror, the light passes thru a ¼ wave plate (660) to rotate the polarization. The axis of the wave plate are oriented to minimize the polarization dependent loss observed throughout the system. In the vertical direction, the beam is focused to a diameter of 32 μm. In the horizontal direction, any given wavelength is focused to a beam diameter of 12 μm, but the center spot of a beam is shifted horizontally by 71 μm/nm. The mirror is tilted at approximately 7 degrees in the downward direction, and is aligned to the optical axis of the lens (640) in the horizontal direction. The mirror is located starting 3 mm below the line between the two lenses (630 & 640) and extends downward. The majority of the mirror (672) is highly reflective, but a small patterned slit is located in the horizontal center of the mirror, oriented in the vertical direction.

Located immediately behind (<0.5 mm) this slit is a second mirror (671) that is tilted upward in the vertical direction by approximately 7 degrees and is highly reflective. The slit starts at the upper edge of the mirror, with a width of 250 μm. This width extends downward for 150 μm. The slit then narrows to 224 μm and extends downward another 150 μm. The slit continues to narrow in steps to 112, 84, 56, and 28 μm respectively, each step having a height of 150 μm. After this the mirror is continuous with no slit.

Light from the input beam hitting the main mirror (672) is directed back thru the quarter wave plate, thru the long focal length lens (640), and onto the diffractive grating. This light is incident on the grating at the same angle that it left on the way to the retro-reflecting mirror (independent of wavelength), but is now offset by 4.5 mm in the vertical direction. Continuing back thru the two lenses, onto the tilt mirror and thru the prism, the light couples efficiently into the Thru collimator and fiber pigtail. With proper alignment (as outlined), the losses associated with this path are dominated by the diffraction efficiency of the grating and the small pass thru losses of each optical element. Input light that reflects off the secondary mirror (671) behind the slit also propagates back thru the optical system, but is offset by 4.5 mm in the opposite vertical direction when it hits the grating, thereby coupling into the Drop collimator and fiber pigtail.

The angular position of the tilt mirror determines both what wavelengths pass thru the slit and where the vertical spot is located on the retro-reflecting mirror. When no power is applied to the tilt mirror, the 1550 nm light is aligned vertically with the slit, and the beams are centered 75 μm above the retro-reflecting mirror. In this position, no substantial amount of light is coupled into the Thru or Drop collimators. As the mirror is tilted in the vertical direction, the light starts to move down and onto the retro-reflecting mirror. At first, a pass-band approximately 800 GHz wide is coupled into the Drop port while the remaining wavelengths are coupled into the Thru port. This has sufficient bandwidth and spectral roll-off for 16 channels spaced at 50 GHz. This pass-band is centered around 1550 nm. Increasing the vertical tilt of the mirror by approximately 0.5 degrees moves the beams to the narrower region of the slit, creating a 400 GHz pass-band. This continues as you continue to tilt the mirror in 0.5 degree increments, creating 200 GHz, 150 GHz, 100 GHz and 50 GHz pass-bands. In the case of the 50 GHz pass-band, the actual spectral characteristics are a 0.5 dB bandwidth of 39 GHz, a 3 dB bandwidth of 50 GHz, a 25 dB bandwidth of 82 GHz, and a 35 dB stop band of 16 GHz. These allow a single channel drop from a 50 GHz grid with appropriate pass-band and isolation. If the mirror is tilted even further, all wavelengths in the C band of 1530 to 1565 are coupled to the Thru port.

In this position, the horizontal tilt of the mirror can be changed, thereby changing the center wavelength to be coupled to the drop port. A Tilt of 5.4 degrees will center 1530 in the pass-band and a tilt of −5.4 degrees will center 1570 in the pass-band. Reducing the vertical tilt of the mirror now couples the chosen wavelength (e.g. 1530 nm) to the drop port.

The invention claimed is:

1. An optical spectral detection device utilizing free space optical beam propagation, comprising:
   a. at least one optical fiber input for receiving an optical beam having multiple wavelengths;
   b. at least one opto-electronic detection device;

c. a single optical tilt element having an actuator with at least one tilt axis for receiving the optical beam;
d. a diffraction element having a surface thereon;
e. an optical beam transfer arrangement positioned between the single optical tilt element and the diffraction element such that tilt actuation of the optical tilt element elicits a proportional change in an angle of incidence of the optical beam onto the diffraction element, wherein the center of rotation for the angular change is the surface of the diffraction element; and
wherein the spectral properties of the optical beam that are detected are selected by selectively positioning the single optical tilt element about at least one of the tilt axes.

2. The optical spectral detection device according to claim 1 wherein the actuator has two tilt axes.

3. The optical spectral detection device according to claim 2 where the two tilt axes enable substantially independent control of both a detected wavelength and optical power at such wavelength directed to the opto-electronic detection device.

4. The optical spectral detection device according to claim 1 where the optical tilt element is a MEMS tilt mirror.

5. The optical spectral detection device according to claim 1 where the optical tilt element is a resonant scanning mirror.

6. The optical spectral detection device according to claim 1 where the diffraction element is a reflective diffraction grating or a transmissive diffraction grating.

7. The optical spectral detection device according to claim 1 where the optical beam transfer arrangement is a lens-based telescope.

8. The optical spectral detection device according to claim 1 where the optical beam transfer arrangement comprises a spherical lens and a cylindrical lens, whereby the optical beam transfer arrangement functions as a lens-based telescope along one optical axis and functions as a focusing/defocusing element in the orthogonal optical axis.

9. The optical spectral detection device according to claim 1 wherein said at least one optical fiber input comprises at least 2 optical fiber inputs.

10. The optical spectral detection device according to claim 1 wherein said at least one opto-electronic detection device comprises at least 2 opto-electronic detection devices.

11. The optical spectral detection device according to claim 1 further comprising at least 2 optical fiber inputs and at least 2 opto-electronic detection devices.

12. The optical spectral detection device according to claim 9 where the optical beam actuator has two tilt axes and such that the two tilt axes enable substantially independent control of both the detected wavelength and the selection of input signal at such wavelength directed to the opto-electronic detection device.

13. The optical spectral detection device according to claim 11 where optical spectra of two optical beams received by the two fiber inputs are pair-wise directed to the two optical outputs such that identical spectral regions of the two optical beams are simultaneously sampled.

14. The optical spectral detection device according to claim 9 further comprising:
a. at least one fiber output;
b. at least one fiber loopback;

wherein said at least one fiber loopback is placed between said at least one fiber input and fiber output such that a signal entering a different fiber input traverses at least two round trips through the diffraction region before being spectrally detected.

15. The optical spectral detection device according to claim 14 where the optical element has two tilt axes such that the two tilt axes enable substantially independent control of both the detected wavelength and the optical beam coupling between the input signals and the fiber outputs or the opto-electronic detection devices so as to select a number of round trips of the input signals through the diffraction element before being spectrally detected to thereby select spectral resolution.

16. An optical spectral detection device utilizing free space optical beam propagation, comprising
a. at least two optical fiber inputs each receiving an optical beam having multiple wavelengths;
b. at least one opto-electronic detection device;
c. a single optical tilt element having an actuator with at least one tilt axis for receiving the optical beams from the at least two fiber inputs;
d. a diffraction element for receiving the optical beams from the single optical tilt element;
wherein the spectral properties of the optical beam that are detected are selected by selectively positioning the single optical tilt element about the tilt axis; and
wherein the optical tilt element has two tilt axes and such that the two tilt axes enable substantially independent control of both the detected wavelength and the selection of input signal at such wavelength directed to the opto-electronic detection device.

17. The optical spectral detection device according to claim 15 further comprising at least 2 opto-electronic detection devices.

18. The optical spectral detection device according to claim 15 where the optical tilt element has two tilt axes such that the two tilt axes enable substantially independent control of both the detected wavelength and the optical beam coupling between the input signals and the fiber outputs or the opto-electronic detection devices so as to select a number of round trips of the input signals through the diffraction element before being spectrally detected to thereby select spectral resolution.

19. An optical spectral detection method of variably adjusting the spectrally detected wavelengths and variably selecting one or more input signals comprising the steps of:
(a) dispersing the spectra of one or more input signals laterally across an optical arrangement oriented to reflect incident wavelengths onto one or more opto-electronic detection devices;
(b) adjusting the position of one or more input signals along a first axis of a single optical tilt element to position a portion of the spectra directed to one or more opto-electronic detection devices; and
(c) adjusting the position of one or more input signals along a second axis of the single optical tilt element perpendicular to the first axis to select the input signal directed to one or more opto-electronic detection devices; and
wherein steps (b) and (c) are performed before step (a).

* * * * *

UNITED STATES PATENT AND TRADEMARK OFFICE
CERTIFICATE OF CORRECTION

PATENT NO. : 7,408,639 B1  
APPLICATION NO. : 11/113957  
DATED : August 5, 2008  
INVENTOR(S) : Thomas Andrew Strasser et al.

Page 1 of 1

It is certified that error appears in the above-identified patent and that said Letters Patent is hereby corrected as shown below:

Col. 5, line 67, after "arrangement", insert -- , --.

Col. 6, line 1, change "200, and" to -- 200 --.

Col. 9, line 20, before "output", change "sperated" to -- separated --.

Col. 11, line 31, before "using", delete -- enabling the --.

Col. 11, lines 50-51, after "wavelengths", change "deplicted" to -- depicted --.

Col. 13, line 44, after "filter", change "can" to -- and --.

Col. 14, line 43, after "detected.", delete -- By --.

Col. 14, line 44, change first word "rotating" to -- Rotating --.

Signed and Sealed this

Twenty-first Day of April, 2009

JOHN DOLL  
*Acting Director of the United States Patent and Trademark Office*